July 6, 1965  P. MATILE ETAL  3,193,353
METHOD OF REMOVING CARBON DIOXIDE FROM AMMONIA
Original Filed Jan. 16, 1958  2 Sheets-Sheet 1

INVENTORS
PASCAL MATILE
ERNST PETER HANS &
BY  WERNER ZOLLINGER

ATTORNEY

United States Patent Office 3,193,353
Patented July 6, 1965

3,193,353
METHOD OF REMOVING CARBON DIOXIDE FROM AMMONIA
Pascal Matile, Geneva, and Ernst Peterhans and Werner Zollinger, Visp, Valais, Switzerland, assignors to Lonza Ltd., Basel, Switzerland, a corporation of Switzerland
Continuation of application Ser. No. 709,331, Jan. 16, 1958. This application Apr. 10, 1962, Ser. No. 186,492
11 Claims. (Cl. 23—196)

This invention relates to urea synthesis and more particularly to the recovery, separation, and re-use of unconsumed ammonia and carbon dioxide reactants of urea synthesis reaction mixtures. This is a continuation of application Serial No. 709,331, filed January 16, 1958, now abandoned.

It is well known that when ammonia and carbon dioxide, or compounds thereof such as ammonium carbonate, bicarbonate, carbamate and the like, are subjected to high temperature and pressure in a closed system urea is formed. For example, urea synthesis has been conducted at pressures of from about 200 to 350 atmospheres in an autoclave maintained at temperatures of 160° to 220° C. During the synthesis reaction ammonia and carbon dioxide reactants primarily combine exothermically to form ammonium carbamate which, at the temperature of the reaction, dissociates into urea and water. As the reaction of ammonia and carbon dioxide to urea and water is only partially complete, residues of such starting reactants and intermediate reaction products remain in the resulting urea containing reaction mixture.

The separation, recovery and re-use of the unreacted starting materials in urea synthesis reaction mixtures is of great importance in establishing the economy and efficiency of an integrated process for the manufatcure of urea. Accordingly, many suggestions have been disclosed for the separation and re-use of unreacted starting materials in urea synthesis reaction mixtures. For example, it is proposed in U.S. Patent No. 1,453,069 to separate gaseous components of a urea synthesis product mixture by distillation and return the separated gases under compression and at a high temperature to the synthesis reactor. A further process for distillation of synthesized reaction mixtures and subsequent separation of removed gases is disclosed in U.S. Patent No. 1,730,208.

U.S. Patents Nos. 1,898,093 and 1,908,995 relate to improved processes for recovering and re-using unconverted urea synthesis reactants. A major portion of the excess ammonia in the synthesis melt is first recoved by distillation at ammonia-liquefying pressure and returned to the synthesis zone. Unconverted ammonium carbamate is next recovered by a second (lower pressure) distillation of the synthesis melt and is absorbed in water (Patent No. 1,898,093) or in a solution of methanol and urea (Patent No. 1,908,995). The water or methanol-urea solution containing absorbed carbamate with additional ammonia and carbon dioxide is subjected to urea forming temperature and pressure in the presence of a substantial excess of ammonia.

In U.S. Patent No. 2,116,881 there is disclosed a further development in processes for reutilization of unconverted reactants in urea syntheses. According to the invention a urea synthesis melt is first subjected to a primary pressure distillation during which at least the major part of the excess ammonia is recovered and returned to the synthesis reaction zone. The residue is thereafter subjected to a two-stage secondary distillation during which unconverted ammonium carbamate, the remainder of excess ammonia, and at least part of the water contained therein, are recovered and returned to the synthesis reaction zone for reaction with fresh ammonia and carbon dioxide.

Some of the deficiencies of the above processes, such as blocking or clogging of distillation apparatus, as by ammonium carbamate accumulation in urea synthesis liquor stills, have been obviated by the method disclosed in U.S. Patent No. 2,716,629. The method therein proposed calls for the addition of water or an aqueous ammonia solution to the distillation process at some level in the enrichment section of an ammonia distillation column. The added water or aqueous ammonia allegedly insures that ammonium carbamate in the treated synthesis solution is carried down through the column and into a heated section at the bottom of the column. The aqueous ammonium carbamate so carried down breaks down into ammonia, carbon dioxide and water. Although the proposed distillation method of the patent prevents crystallization of ammonium carbamate, the additional water in the column requires a substantial increase in column heat consumption to accomplish required evaporation.

The present invention relates broadly to a process of high temperature-high pressure synthesis of urea from carbon dioxide and ammonia in the presence of excess ammonia followed by degasification with return of separated gases to the synthesis reactor but, introduces into such a process improved methods of separating the gases obtained during degasification of the urea solution issuing from the synthesis reactor.

It is an object of the present invention to provide an integrated system for producing urea wherein a urea containing product mixture from a synthesis reactor is economically freed of unreacted ammonia and carbon dioxide whereafter the ammonia and carbon dioxide are effectively separated.

A further object of the invention is to provide an integrated system for urea synthesis and purification, including synthesis apparatus utilizing ammonia and carbon dioxide reactants with excess ammonia, wherein the urea synthesis reaction mixture is economically freed of water and unreacted ammonia and carbon dioxide whereafter the feed ammonia and carbon dioxide gases are effectively separated and returned to the synthesis apparatus as recycle reactants.

A still further object of the invention is to provide an integrated system for urea synthesis and purification wherein a urea containing product mixture from a synthesis reactor is rapidly freed of unreacted ammonia and carbon dioxide whereafter the freed ammonia and carbon dioxide gases are economically separated by selective absorption and returned to the synthesis reactor as recycle reactants.

Further objects and advantages of the invention will appear from the following description thereof taken in conjunction with examples including the attached drawings.

In accordance with the present invention the above objects are accomplished by separating, as a gaseous mixture, substantially all of the unreacted ammonia and carbon dioxide and a portion of the water from the urea containing solution issuing from a high-pressure synthesis reactor and thereafter separating ammonia from such gaseous mixture by selective absorption of the carbon dioxide in an absorption solution with the absorption carried out at a pressure determined by the liquefaction temperature of the ammonia.

In order to obtain a high degree of reactant conversion to form urea, synthesis is preferably conducted with an excess of ammonia above stoichiometric requirements. The mixture discharged from the high-pressure reactor contains, in addition to urea, water and excess ammonia as well as unreacted carbon dioxide, either as such or in the form of ammonium carbamate or carbonates. If the discharged reaction mixture is not to be used directly, as for example as a fertilizer solution, economics dictate that as much as possible of the ammonia in such mixture must be separated, liquefied and returned to the synthesis reactor, and that such liquefaction be effected without costly recompression. To effect such separation, liquefaction, and return of the unreacted and/or excess ammonia of such synthesis product mixtures, mixture degassing and subsequent gas separation is carried out at pressures of about 5.5 to 15.0 kg./cm.$^2$ whereby liquefaction of the ammonia occurs at about 5° to 40° C.

It is important to the process that initial decompression and degasification of the reaction mixture, issuing from the synthesis reactor, be accomplished immediately so as to separate as much as possible of the carbon dioxide simultaneously with the excess ammonia. Such separation is preferably accomplished in accord with the teaching of co-pending application Serial No. 622,729, filed November 19, 1956, now U.S. Patent No. 2,955,716. It is also important to the process to separate, substantially completely, carbon dioxide from the ammonia-carbon dioxide gas mixture by absorption while performing such absorption as economically as possible. Accordingly, as an important feature of the invention, the ammonia in the gaseous mixture containing ammonia, carbon dioxide and some water is freed by contacting the mixture with an appropriate absorption solution under a pressure determined by the liquefaction temperature of the ammonia. The gaseous ammonia, substantially free of carbon dioxide, can then be easily liquefied by indirect heat exchange with cooling water without danger of blocking or clogging of the heat exchange apparatus.

According to the invention, a preferred absorption medium for carbon dioxide is an aqueous solution of ammonium carbonate and ammonia, such as obtained for example by absorbing such gases in water, for circulation through the absorption section. The efficiency of the process is enhanced by arranging at least two and preferably three contact stages in series in the absorption section. The temperature of each stage is controlled by indirect heat abstraction whereby the circulating absorption solution has a decreasing ammonia concentration and an increasing carbon dioxide concentration as it passes from stage to stage in countercurrent contact with the gaseous mixture of ammonia and carbon dioxide. In other words, the temperature-pressure conditions in the absorption section are so adjusted from stage to stage so that within the initial gas mixture contact stage gas-liquid contact is accomplished with an ammonium carbonate solution of high carbonate concentration and low excess ammonia concentration, the working temperature of such initial stage being maintained within a narrow temperature range (about 10° C.) between the crystallization temperature of ammonium carbamate and the boiling temperature of the absorption solution. By increasing the contact solution circulation rate and correspondingly adjusting the volume of circulating solution, abrupt changes in the temperature and concentration of the absorption solution, which might cause blocking of the contact apparatus due to crystallization, are easily avoided. Excess water, required in the absorption stages to prevent crystallization of the carbamate in the absorption solution, is introduced into the absorption section at an appropriate point, preferably adjacent the gas exit of the final stage of gas contact. Instead of water, ammonia liquor or a diluted solution of ammonium carbonates may be used.

It has also been found that a solution of urea may be introduced to the absorption system instead of water to inhibit crystallization and in such case absorption is accomplished by a solution comprised of urea, ammonium carbonate and ammonia. The presence of urea in the absorption medium effects a lowering of the crystallization temperature of the dissolved ammonium carbonate whereby more reliable absorption results are obtained with respect to an absorption system using an equivalent quantity of water addition. It has been found that the urea solution, introduced as a final gas contact medium in the absorption section, may be obtained from the final bottoms stream of the absorption section, may consist of a mother liquor of urea from auxiliary urea product processing systems, or may comprise of a urea solution which has been treated in accord with the teaching of co-pending application Serial No. 622,734, filed November 19, 1956, now Patent No. 2,854,482, whereby the biuret content thereof is materially reduced. Further, the contact solutions (containing urea) after distribution to each of the several absorption stages may, after its final contact with the gaseous mixture (ammonia, carbon dioxide and water), be returned to the synthesis section or be used directly as a urea-containing fertilizer solution.

During operation of a multiple stage absorption system in accord with the present invention, a small portion of the circulating absorption solution is withdrawn from each stage and mixed with the circulating absorption solution of the next preceding stage in order to return the carbon dioxide removed from gases therein to the absorption solution of such preceding stage. In this manner the carbon dioxide and water (or other contact media as described heretofore) concentration are maintained at their required value in each stage.

The total carbon dioxide expelled from the absorption section leaves the initial stage of such section as a bottoms solution stream. This expelled solution contains little of the excess of ammonia over the stoichiometric composition and little water and can, with recovery of the carbon dioxide, be processed to make ammoniated fertilizers.

An important feature of the invention resides in the fact that the absorption liquid (essentially an aqueous solution of carbonates) discharged from the absorption section, may be returned directly to the synthesis reactor for reaction with other reactants. In view of the relatively low aqueous content of this solution, only about 0.4 mole of water is introduced into the reactor for every mole of carbon dioxide so that for a desired total reactant ratio of 4.5 moles of ammonia per mole of carbon dioxide, carbon dioxide conversion of at least 72% is obtained. If the absorption solution is not recycled to the synthesis reactor, about 75% of the carbon dioxide feed and about 63% of the ammonia feed (with 125% ammonia excess) is converted into urea. However, if the solution is returned to the synthesis cycle, the corresponding conversion will be about 94% of the carbon dioxide feed and about 86% of the ammonia feed.

Another important feature of the invention resides in the fact that the residual ammonia and carbon dioxide in the urea liquor, after an initial decompression of the synthesis product mixture, may be separated in a second gas separator operated at about 90° to 120° C. by further decompression to atmospheric pressure whereby a gaseous mixture comprising about 50% ammonia, 25% carbon dioxide, and 25% water, is obtained. This gaseous mixture, with or without the addition of a carbonate solution from the absorption section, may be processed for use as fertilizers or the like or may, in accord with the present invention, be absorbed in a washing solution to provide an additional useable aqueous solution. This wash solution including absorbed ammonia and/or carbon dioxide may be utilized in the absorption system as an additional intermediate contact media for purifying ammonia by carbon dioxide absorption. The aqueous content of the discharged absorption solution, when returned to the synthesis cycle, is considerably greater than the water content of the aqueous solution recovered from the absorption section and similarly recycled as described heretofore, so that the quantity of reacting carbon dioxide is decreased by about 3%.

A still further feature of the invention resides in the fact that the aqueous solution formed during the above described washing of gases discharged from the second stage gas separator may be returned to the synthesis reactor as an additional recycle source of reactants without a considerable increase in the quantity of undesired associated water. It has further been found that the aqueous content of the wash solution, can be appreciably reduced without impairing its absorption efficiency by the addition of carbon dioxide to the gases from the second stage of decompression whereby there is formed an ammoniacal solution of carbonates, the partial pressure of ammonia therein being substantially lower than the partial pressure of ammonia in a normal aqueous solution of such gases.

A further reduction in the quantity of water, introduced into the synthesis cycle by total reflux of unreacted materials, can be obtained by passing the wash solution, including absorbed gases from the second stage gas separator, back to the initial decompression separation section of the integrated system. In this manner of recycle a great portion of the water added to the system is discharged from the plant with the product urea while the unconverted and separated carbon dioxide and ammonia are conducted through the pressure separating section of the system.

In returning the final gas absorption solution to the initial separating system or to the absorption section, the water diluent therein can be replaced by a dilute solution of urea.

Through the use of a total reflux system only about 0.5 mole of water, per mole of carbon dioxide fed to the reactor, is returned to the synthesis cycle which, with about 140% of excess ammonia, produces a carbon dioxide conversion of over 71%, the total of ammonia and carbon dioxide yields then attained being about 98%.

Various modifications may be made in the details and methods of procedure according to the invention without deviating from the scope thereof, as will be illustrated by reference to the following examples of actual operating data read in conjunction with the accompanying diagrammatic flow sheets.

EXAMPLE I

Figure 1:
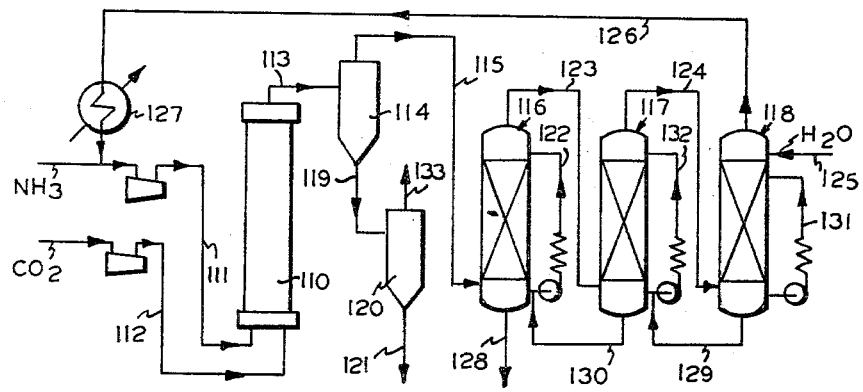
FIGURE 1 is a flow sheet illustrating one form of the invention.

Referring to FIGURE 1, reference numeral 110 refers to a high pressure urea synthesis reactor into which ammonia and carbon dioxide reactants are introduced under pressure through lines 111 and 112, respectively. With reactor 110 operated at about 200° C. and about 300 atmospheres pressure the discharged synthesis product mixture (2680 kg./hr.) in line 113 is comprised of 37% urea, 11% $H_2O$, 43% $NH_3$, and 9% $CO_2$. The synthesis product mixture in line 113 is then passed to an initial separator 114, operated at about 15 atmospheres and about 150° C., wherein the urea solution is partially degassed. The separated gases (81% $NH_3$, 16% $CO_2$ and 3% $H_2O$) leave separator 114 through line 115 and are passed to the absorption section of the plant which includes at least two absorption stages 116 and 117 and preferably a third stage 118. The partially degassed solution (70% urea, 19.5% $H_2O$, 7% $NH_3$ and 3.5% $CO_2$) leaves separator 114 through line 119 and is decompressed in a second gas separator 120 to atmospheric pressure. The decompressed product solution leaving gas separator 120 through line 121 contains about 80% urea.

The separated gases of line 115 passing to the absorption section are contacted in tower 116 with an absorption liquid consisting of about 40% $NH_3$, 39% $CO_2$ and 21% $H_2O$. This contact liquid enters the tower near the top through line 122 at a working temperature several degrees above the crystallization point of such liquid (90° to 100° C.). The overhead stream 123 of tower 116, which contains 87% $NH_3$, 8% $CO_2$ and 5% $H_2O$, next passes through towers 117 and 118 with final absorption in tower 118 accomplished with water (70 liters/hr.) entering through line 125. The purified ammonia overhead stream leaving tower 118 through line 126 contains less than 20 p.p.m. of $CO_2$ and less than 0.1% $H_2O$. The purified ammonia is easily liquified by indirect heat exchange with water in condenser 127 whereafter it is returned to the synthesis reactor with fresh ammonia feed. The total quantity of $CO_2$ introduced to the absorption section in line 115 leaves such section at the bottom of tower 116 through line 128 in the form of a solution corresponding to the recirculating contact solution 122 circulated to the top of tower 116. By continuously passing a part of the circulating solutions of towers 118 and 117 back through towers 117 and 116, respectively, proper solution concentration is maintained in each tower. Such stream (128), as well as the gas stream 133 leaving gas separator 120 may be utilized in the preparation of fertilizers such as nitrate or sulphate of ammonia or may be recycled to reactor 110.

In Table I below, there is tabulated analyses of various process streams as well as operating requirements of the process route depicted in FIGURE 1 and Example 1. The quantity of liquid to be recirculated in each contact stage is maintained as large as possible in order to avoid or restrict variations of temperature and contact solution concentration. This quantity may be about 35 to 45 m.³/hr. for lines 122, 132 and 131.

*Table I*

| Designation | Component (weight percent) | | | | Quantity, kg./hr. | Operating conditions | |
|---|---|---|---|---|---|---|---|
| | Urea | $H_2O$ | $NH_3$ | $CO_2$ | | Temp., ° C. | Press., atmos. |
| Reactor feed (total) | | | 63.5 | 36.5 | 2,680 | 200 | 300 |
| Reactor product, line 113 | 37.0 | 11.0 | 43.0 | 9.0 | 2,680 | | |
| Separator overhead, line 115 | | 3.0 | 81.0 | 16.0 | 1,270 | 150 | 15 |
| Absorber overhead, line 123 | | 5.0 | 87.0 | 8.0 | 1,350 | 97 | 15 |
| Absorber overhead, line 124 | | 1.6 | 98.0 | 0.4 | 1,300 | 54 | 15 |
| Absorber overhead, line 126 | | 0.1 | 99.9 | | 833 | 41 | 15 |
| Absorption stream 125 | | 100.0 | | | 70 | 20–40 | 15 |
| Bottom stream 129 | | 15.5 | 83.5 | 1.0 | 535 | 41–42 | 15 |
| Bottom stream 130 | | 21.0 | 62.0 | 17.0 | 590 | 54–55 | 15 |
| Absorption stream 122 | | 21.0 | 40.0 | 39.0 | 35,000 | 96–99 | 15 |
| Bottom stream 128 | | 21.0 | 40.0 | 39.0 | 505 | 96–99 | 15 |
| Separator bottoms, line 119 | 70.0 | 19.5 | 7.0 | 3.5 | 1,410 | 150 | 15 |
| Extractor bottoms, line 121 | 80.0 | 18.0 | 0.9 | 1.1 | 1,250 | 100 | 0.05 |

EXAMPLE II

Figure 2:
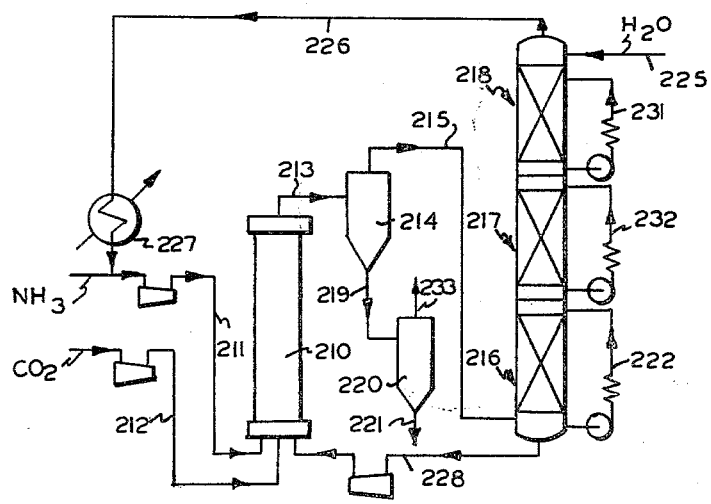
FIGURE 2 is a flow sheet illustrating a modification of the invention wherein the absorption stages are in a single tower.

Referring to FIGURE 2, reference numbers 210, 214 and 220 refer to apparatus like the apparatus designated by numerals 110, 114 and 120 of FIGURE 1, respectively. With reactor 210 and separator 214 operated in substantially the same manner as the previously described operation of reactor 110 and separator 114, but with absorption liquor recycle (line 228) to the reactor, the gases leaving separator 214 in line 215 contain about 78% $NH_3$, 17% $CO_2$ and 5% $H_2O$. These gases pass to the absorption section of the plant which, as illustrated, includes three absorption stages 216, 217 and 218 in a single tower. In each stage (216, 217 and 218) of the absorption section there is included a circuit (222, 232 and 231, respectively) incorporating a cooler through which the absorption medium (mixture of $NH_3$, $CO_2$ and $H_2O$) is continuously circulated. A sufficient quantity of water (80 liters/hr./ton of urea) or ammonia liquor is supplied to the top of stage 218 through line 225 for final absorption. The purified ammonia overhead stream leaving stage 218 of the purification tower through line 226 contains less than 20 p.p.m. of $CO_2$ and less than 0.1% $H_2O$. The purified ammonia is easily liquefied by indirect heat exchange with water in condenser 227 whereafter it is returned to the synthesis reactor with fresh ammonia feed. The absorption solution stream leaving the bottom of stage 216 through line 228 is comprised of the net quantity of $H_2O$, $CO_2$ and $NH_3$ passing downwardly through the stages and not recirculated in lines 231, 232 and 222 to their respective stages. Such stream (228) passes to the high pressure reactor to form a portion of the reactant feed. The urea containing solution of line 219 passes to gas separator 220 for decompression. The decompressed urea solution, comprised of about 73% urea and practically no free $NH_3$ or $CO_2$, in line 221 may be used directly for the production of crystalline or granular forms of urea.

In Table II below, there is tabulated analyses of various process streams as well as operating requirements of the process route depicted in FIGURE 2 and Example 2.

Table II

| Designation | Component (weight percent) | | | | Quantity, kg./hr. | Operating conditions | |
|---|---|---|---|---|---|---|---|
| | Urea | $H_2O$ | $NH_3$ | $CO_2$ | | Temp., °C. | Press., atmos. |
| Reactor feed (total) | | 5.0 | 60.0 | 35.0 | 2,993 | 200 | 300 |
| Reactor product, line 213 | 34.0 | 15.0 | 41.0 | 10.0 | 2,993 | | |
| Separator overhead, line 215 | | 5.0 | 78.0 | 17.0 | 1,473 | | |
| Absorbent, line 225 | | 100.0 | | | 80 | 20–40 | 15 |
| Absorbent, stage 216 | | 23.0 | 39.0 | 38.0 | | 98 | 15 |
| Absorbent, stage 217 | | 22.0 | 65.0 | 13.0 | | 54 | 15 |
| Absorbent, stage 218 | | 14.0 | 85.0 | 1.0 | | 41 | 15 |
| Absorber overhead, line 226 | | 0.1 | 99.9 | | 882 | 40 | 15 |
| Bottom stream 228 | | 23.0 | 39.0 | 38.0 | 670 | | |
| Separator bottoms, line 219 | 64.0 | 24.0 | 7.0 | 5.0 | 1,520 | 150 | 15 |
| Extractor bottoms, line 221 | 73.0 | 25.0 | 0.8 | 1.2 | 1,365 | 100 | 0.05 |

EXAMPLE III

Figure 3:
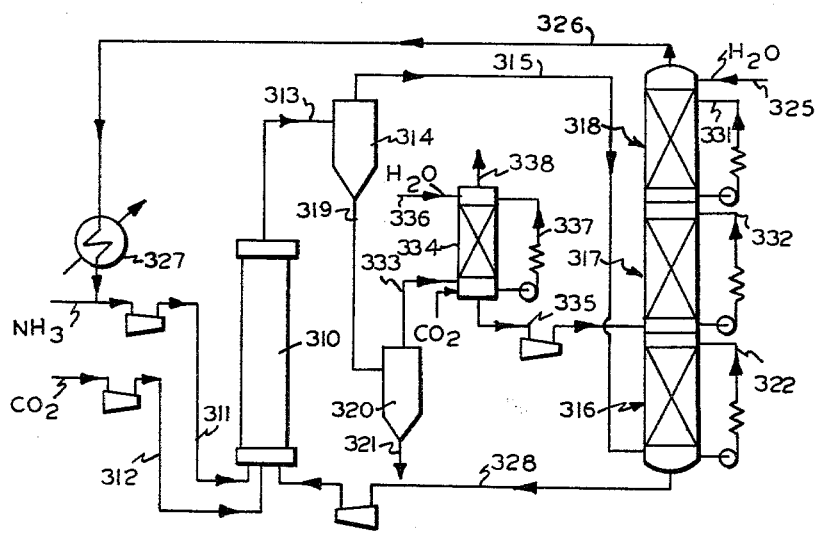
FIGURE 3 is a modification of FIGURE 2 wherein a wash liquid is produced for use in the first and second absorption stages and FIGURE 4 is a modification of FIGURE 3 wherein the wash solution is recycled to the initial product separator.

Referring to FIGURE 3, reference numerals 310, 314 and 320 refer to apparatus like the apparatus designated by numerals 210, 214 and 220 of FIGURE 2, respectively. With reactor 310 and separator 314 operated in substantially the same manner as the previously described operation of reactor 210 and separator 214, but with absorption liquor recycle (line 328) to the reactor and water or ammonia liqour washing (334) (at atmospheric pressure) of the separator gases (333), a washing medium (including absorbed gases), suitable for use as first and second stage absorbent, is produced and passed through line 335 to the bottom of stage 317 of the absorption section. The wash medium leaving wash tower 334 through line 335 contains about 58% $H_2O$, 28% $NH_3$ and 14% $CO_2$. Carbon dioxide can be fed to the washer in order to reduce the aqueous content of the solution if desired.

In Table III below, there is tabulated analyses of various process streams as well as operating requirements of the process route depicted in FIGURE 3 and Example 3.

Table III

| Designation | Component (weight percent) | | | | Quantity, kg./hr. | Operating conditions | |
|---|---|---|---|---|---|---|---|
| | Urea | $H_2O$ | $NH_3$ | $CO_2$ | | Temp., °C. | Press., atmos. |
| Reactor feed (total) | | 9.0 | 59.0 | 32.0 | 3,310 | 200 | 300 |
| Reactor product, line 313 | 30.0 | 18.0 | 42.0 | 10.0 | 3,310 | | |
| Separator overhead, line 315 | | 5.0 | 78.0 | 17.0 | 1,615 | | |
| Absorbent, line 325 | | 100.0 | | | 75 | 20–40 | 15 |
| Absorbent, stage 316 | | 31.0 | 35.0 | 34.0 | | 98 | 15 |
| Absorbent, stage 317 | | 22.0 | 65.0 | 13.0 | | 54 | 15 |
| Absorbent, stage 318 | | 14.0 | 85.0 | 1.0 | | 41 | 15 |
| Absorber overhead, line 326 | | 0.1 | 99.9 | | 1,038 | 40 | 15 |
| Bottom stream 328 | | 31.0 | 35.0 | 34.0 | 950 | 98 | 15 |
| Separator bottoms, line 319 | 59.0 | 31.0 | 6.5 | 3.5 | 1,690 | 150 | 15 |
| Extractor bottoms, line 321 | 67.0 | 31.2 | 0.8 | 1.0 | 1,493 | 100 | 0.05 |
| Extractor overhead, line 333 | | 25.0 | 52.0 | 23.0 | 200 | 100 | 0.05 |
| Wash, line 336 | | 100.0 | | | 90 | 20 | 0.05 |
| Washer bottoms, line 335 | | 48.0 | 35.0 | 17.0 | 295 | 22 | 0.05 |

EXAMPLE IV

Figure 4:
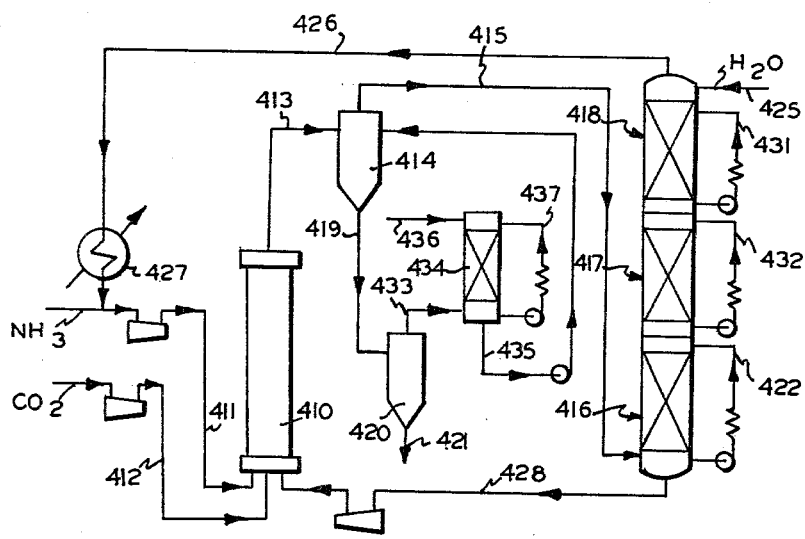

Referring to FIGURE 4, reference numerals 410, 414 and 420 refer to apparatus like the apparatus designated by numerals 310, 314 and 320 of FIGURE 3, respectively. With a system operated in the same manner as the system of Example 3, but with the solution from washer 434 in line 435 returned to the separator 414, additional advantage is gained since the bulk of the water added to washer 434 remains in the urea solution and does not return to the reactor as in Example 3, thereby providing a higher synthesis reaction yield. While in Example 3 about 300 kg./hr. of water is returned to reactor 310 from stage 316 through line 328, only about 220 kg./hr. of water passes through line 428 for return to the reactor 410 of the present example. The operating temperature in stage 416 is about 20 to 30° C.

In Table IV below, there is tabulated analyses of various process streams as well as operating requirements of the process route depicted in FIGURE IV and Example IV.

Table IV

| Designation | Component (weight percent) | | | | Quantity, kg./hr. | Operating conditions | |
|---|---|---|---|---|---|---|---|
| | Urea | $H_2O$ | $NH_3$ | $CO_2$ | | Temp., °C. | Press., atmos. |
| Reactor feed (total) | | 6.0 | 62.0 | 32.0 | 3,325 | 200 | 300 |
| Reactor product, line 413 | 30.0 | 15.5 | 45.0 | 9.5 | 3,325 | | |
| Separator overhead, line 415 | | 6.5 | 75.0 | 18.5 | 1,821 | 150 | 15 |
| Absorbent, line 425 | | 100.0 | | | | | |
| Absorbent, stage 416 | | 24.0 | 38.0 | 38.0 | | 98 | 15 |
| Absorbent, stage 417 | | 22.0 | 65.0 | 13.0 | | 54 | 15 |
| Absorbent, stage 418 | | 14.0 | 85.0 | 1.0 | | 41 | 15 |
| Absorbent overhead, line 426 | | 0.1 | 99.9 | ¹20 | 1,021 | | |
| Bottom stream 428 | | 24.0 | 38.0 | 38.0 | 905 | | |
| Separator bottoms, line 419 | 56.0 | 33.0 | 7.0 | 4.0 | 1,776 | 150 | 15 |
| Extractor bottoms, line 421 | 66.0 | 32.2 | 0.8 | 1.0 | 1,532 | 100 | 0.05 |
| Extractor overhead, line 433 | | 27.0 | 51.0 | 22.0 | 210 | 100 | 0.05 |
| Wash, line 436 | | 100.0 | | | 85 | | |
| Washer bottoms, line 435 | | 50.0 | 29.0 | 21.0 | 368 | 20-30 | 0.05 |

¹ Parts per million.

EXAMPLE V

Where a urea solution is used instead of water in washer 434 there is a further improvement in the water balance in the total waste-gas recovery system. Thus, the addition through line 436 of a 30° C. solution comprised of 60 to 70% urea, such as may be obtained as a mother liquor from a urea crystallization plant, produces a solution in line 435 comprised of about 23% $NH_3$, 12% $CO_2$, 31% $H_2O$, and 34% urea, such solution having a crystallization temperature of about 20° C. The quantity of water thereby returned to separator 414 is about 145 kg./hr. for a urea output of about 1000 kg./hr. whereas with only water used as the wash in washer 434, about 180 kg./hr. of water is returned to separator 414 for an equivalent urea output.

It will be appreciated that various modifications may be made in the invention described above without deviating from the scope thereof as defined in the appended claims.

We claim:
1. In a process for recovering substantially carbon dioxide-free ammonia from an aqueous urea solution obtained by reacting ammonia and carbon dioxide in a urea synthesis autoclave at urea forming temperatures and pressures in the presence of an excess of ammonia over stoichiometrical requirements the steps comprising:
 (a) passing said aqueous urea solution including unreacted and absorbed ammonia and carbon dioxide and intermediate reaction products through a decompression zone;
 (b) heating said solution in said decompression zone to a temperature sufficient to evolve an off-gas mixture comprised of a major portion of ammonia and a minor portion of carbon dioxide and water vapor, a part of the ammonia and carbon dioxide being formed by decomposing at least a portion of said intermediate reaction products;
 (c) passing said off-gas mixture upwardly through at least two successive absorption zones in counter-current contact with an absorbing medium comprised of an aqueous solution of ammonium carbonate and ammonia whereby substantially all of the carbon dioxide is absorbed in said medium and substantially all of the water vapor in said off-gas is condensed, said contacts being carried out at a pressure of from amout 5.5 to 15 kg./cm.² and maintaining the temperature at each stage between approximately the boiling point of said absorbing medium and the crystallization temperature of ammonium carbonates and carbamate within said absorbing medium; and
 (d) removing substantially carbon dioxide-free ammonia as an overhead gas from the final absorption zone.

2. The process as defined in claim 1 wherein said carbon dioxide-free ammonia is liquefied by cooling the same to a temperature of from about 5° to 40° C., and said liquefied ammonia is recycled to said autoclave.

3. The process as defined in claim 1 wherein said contact is performed with an absorbing medium consisting of a recycled major portion of the absorbing medium of said contact including absorbed carbon dioxide and a crystalline inhibiting medium selected from the group consisting of water, ammonia liquor, a dilute ammonium carbonate solution and aqueous urea, and wherein the contact of each preceding zone being carried out with an absorbing medium of the contact including absorbed carbon dioxide and the minor portion of absorbing medium from the next succeeding absorption zone not recycled through said succeeding zone.

4. The process as defined in claim 1 wherein the minor portion of the carbon dioxide absorbing medium from the initial contact not recycled through such initial contact is removed from said initial contact and contains the maximum concentration of carbon dioxide with respect to the absorbing media in all succeeding contacts.

5. The process as defined in claim 4 wherein said minor portion of the carbon dioxide absorbing medium is returned to said urea synthesis autoclave as an additional source of urea forming reactants.

6. In a process for recovering substantially carbon dioxide-free ammonia from an aqueous solution obtained by reacting ammonia and carbon dioxide in a urea synthesis autoclave at urea forming temperatures and pressures in the presence of an excess of ammonia over stoichiometrical requirements the steps comprising:
 (a) passing said aqueous urea solution including unreacted and absorbed ammonia and carbon dioxide and intermediate reaction products through a decompression zone maintained at a pressure of from about 5.5 to 15.0 kg./cm.²;
 (b) heating said solution in said decompression zone to a temperature sufficient to evolve an off-gas mixture comprised of a major portion of ammonia and a minor portion of carbon dioxide and water vapor, a part of the ammonia and carbon dioxide being formed by decomposing at least a portion of said intermediate reaction products;
 (c) passing said off-gas mixture upwardly through at least two successive absorption zones in counter-current contact with an absorbing medium comprised of an aqueous solution of ammonium carbonate and ammonia whereby substantially all of the carbon dioxide is absorbed in said medium and substantially all of the water vapor in said off-gas is condensed, said contacts being carried out at a pressure of from about 5.5 to 15.0 kg./cm.$^2$ and maintaining the temperature at each stage between approximately the boiling point of said absorbing medium and the crystallization temperature of ammonium carbonates and carbamate within said absorbing medium;

(d) removing substantially carbon dioxide-free ammonia as an overhead gas from the final absorption zone;

(e) passing said decompressed solution through a second decompression zone wherein the pressure is reduced to atmospheric pressure thereby separating from said decompressed solution an additional off-gas mixture comprised of ammonia, carbon dioxide and water vapor; and (f) absorbing said additional off-gas mixture in an independent wash medium selected from the group consisting of water and aqueous urea.

7. The process as defined in claim 6 wherein the independent wash medium including absorbed off-gas is returned to the urea synthesis autoclave as an additional source of urea forming reactants.

8. The process as defined in claim 6 wherein the independent wash medium including absorbed off-gas is introduced into one of said absorption zones as an additional absorbing medium.

9. The process as defined in claim 6 wherein additional amounts of carbon dioxide is introduced into the independent wash medium for absorption therein.

10. The process as defined in claim 6 wherein the independent wash medium including absorbed off-gas is introduced into the initial decompression zone.

11. The process as defined in claim 6 wherein a crystallization inhibiting medium selected from the group consisting of water, ammonia liquor, a dilute ammonium carbonate solution and aqueous urea is added to said final absorption zone.

References Cited by the Examiner
UNITED STATES PATENTS

| | | | |
|---|---|---|---|
| 1,897,725 | 2/33 | Gaus et al. | 23—2 X |
| 2,913,493 | 11/59 | Sze et al. | 23—193 X |

OTHER REFERENCES

Cook: "Urea," Chemical Engineering Progress, vol. 50, No. 7, July 1954, pgs. 327—331.

MAURICE A. BRINDISI, *Primary Examiner.*